(12) United States Patent
Vakharwala et al.

(10) Patent No.: US 11,169,929 B2
(45) Date of Patent: Nov. 9, 2021

(54) PAUSE COMMUNICATION FROM I/O DEVICES SUPPORTING PAGE FAULTS

(71) Applicant: Intel Corporation, Santa Clara, CA (US)

(72) Inventors: Rupin Vakharwala, Hillsboro, OR (US); Amin Firoozshahian, Mountain View, CA (US); Stephen Van Doren, Portland, OR (US); Rajesh Sankaran, Portland, OR (US); Mahesh Madhav, Portland, OR (US); Omid Azizi, Redwood City, CA (US); Andreas Kleen, Portland, OR (US); Mahesh Maddury, Santa Clara, CA (US); Ashok Raj, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 256 days.

(21) Appl. No.: 15/958,591

(22) Filed: Apr. 20, 2018

(65) Prior Publication Data
US 2019/0042461 A1 Feb. 7, 2019

(51) Int. Cl.
| | |
|---|---|
| *G06F 12/1009* | (2016.01) |
| *G06F 3/06* | (2006.01) |
| *G06F 12/0862* | (2016.01) |
| *G06F 9/38* | (2018.01) |
| *G06F 12/1081* | (2016.01) |

(Continued)

(52) U.S. Cl.
CPC ........ *G06F 12/1009* (2013.01); *G06F 3/0614* (2013.01); *G06F 3/0659* (2013.01); *G06F 9/3802* (2013.01); *G06F 12/0862* (2013.01); *G06F 12/1081* (2013.01);
(Continued)

(58) Field of Classification Search
CPC ............. G06F 12/1009; G06F 12/0862; G06F 12/1045; G06F 3/0614; G06F 3/0659; G06F 9/3802
See application file for complete search history.

(56) References Cited

U.S. PATENT DOCUMENTS

2014/0229685 A1* 8/2014 Blaner ................ G06F 12/0831
711/146
2018/0011651 A1 1/2018 Sankaran et al.

OTHER PUBLICATIONS

European Search Report dated Sep. 5, 2019, on Application No. 19161453.6-1221.

(Continued)

*Primary Examiner* — William E. Baughman
(74) *Attorney, Agent, or Firm* — Nicholson De Vos Webster & Elliott LLP

(57) ABSTRACT

A processing device includes a core to execute instructions, and memory management circuitry coupled to, memory, the core and an I/O device that supports page faults. The memory management circuitry includes an express invalidations circuitry, and a page translation permission circuitry. The memory management circuitry is to, while the core is executing the instructions, receive a command to pause communication between the I/O device and the memory. In response to receiving the command to pause the communication, modify permissions of page translations by the page translation permission circuitry and transmit an invalidation request, by the express invalidations circuitry to the I/O device, to cause cached page translations in the I/O device to be invalidated.

18 Claims, 11 Drawing Sheets

(51) Int. Cl.
*G06F 12/1045* (2016.01)
*G06F 12/1027* (2016.01)
(52) U.S. Cl.
CPC ...... *G06F 12/1027* (2013.01); *G06F 12/1045* (2013.01); *G06F 2212/6028* (2013.01); *G06F 2212/683* (2013.01)

(56) References Cited

OTHER PUBLICATIONS

Firmware Security et al: "white paper A Tour Beyond BIOS: Using IOMMU for OMA Protection in UEFI Firmware Authors: Table of Contents", Oct. 9, 2017 (Oct. 9, 2017), XP055615455, Retrieved from the Internet: URL:https://firmware.intel.com/sites/defaulUfiles/.

* cited by examiner

300

```
while a core is executing instructions, receive a command to pause
communication between an I/O device that supports page faults
310
```

```
in response to receiving the command to pause the communication: modify
permissions of page translations; and transmit, to the I/O device, an
invalidation request to cause cached page translations in the I/O device to be
invalidated
320
```

```
transmit the page translations comprising the modified permissions to the
I/O device
330
```

```
forgo transmitting a response to a page fault request from the I/O device
340
```

```
receive a command to exit the pause of the communication between the I/O
device and the memory
350
```

FIG. 3

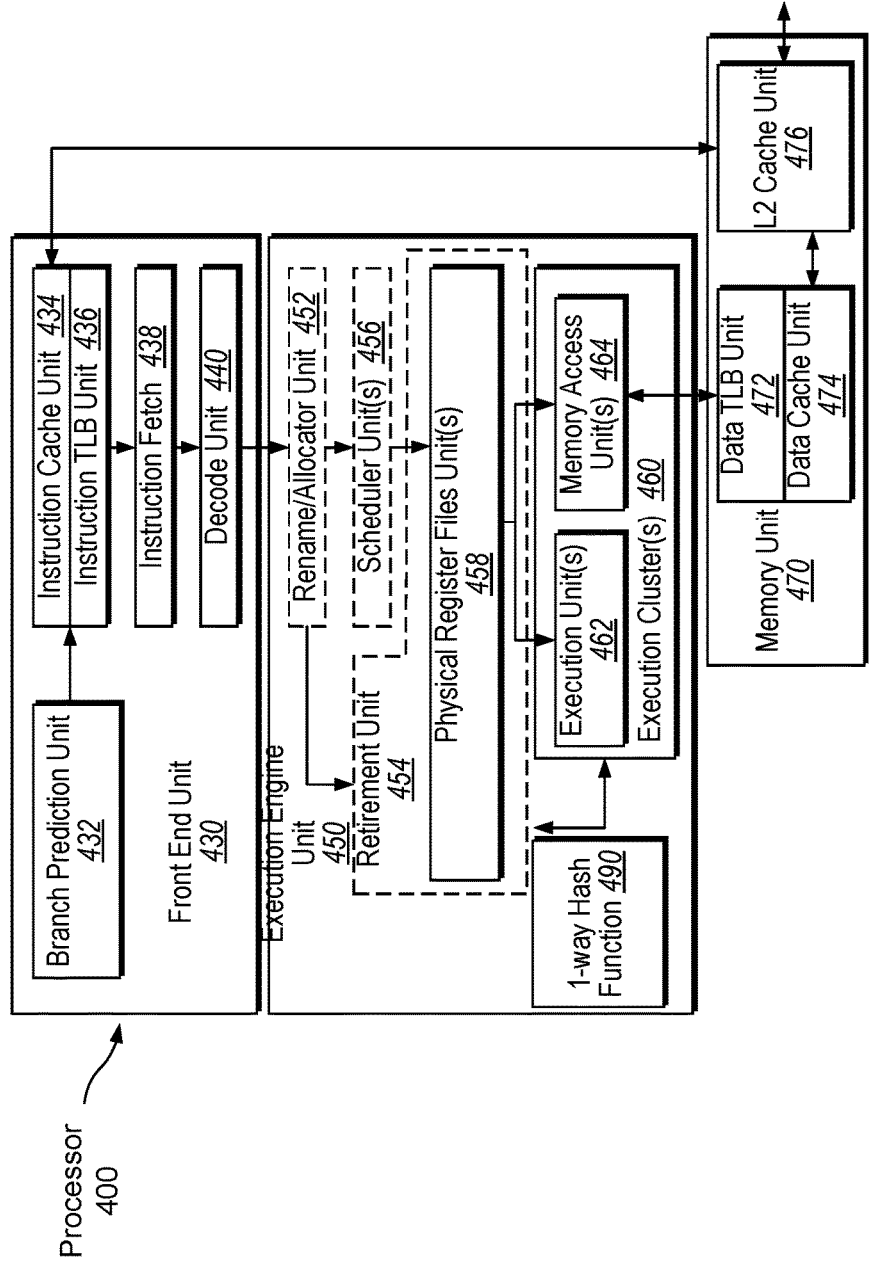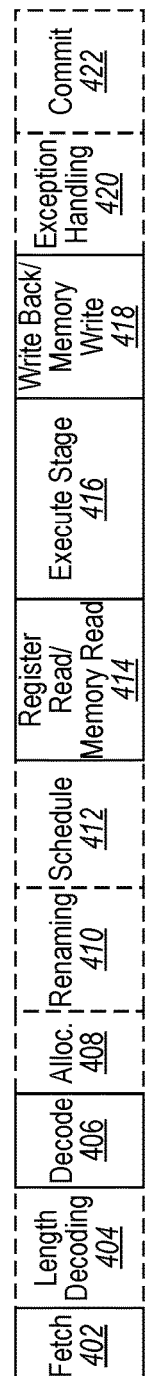

US 11,169,929 B2

PAUSE COMMUNICATION FROM I/O DEVICES SUPPORTING PAGE FAULTS

BRIEF DESCRIPTION OF THE DRAWINGS

FIG. 3 is a flow chart of a method for pausing communication from an I/O device supporting page faults according to an embodiment.

FIG. 4A is a block diagram illustrating a micro-architecture for a processor according to an embodiment of the disclosure.

FIG. 4B is a block diagram illustrating an in-order pipeline and a register renaming stage, out-of-order issue/execution pipeline according to an embodiment of the disclosure.

DESCRIPTION OF EMBODIMENTS

Figure 1:
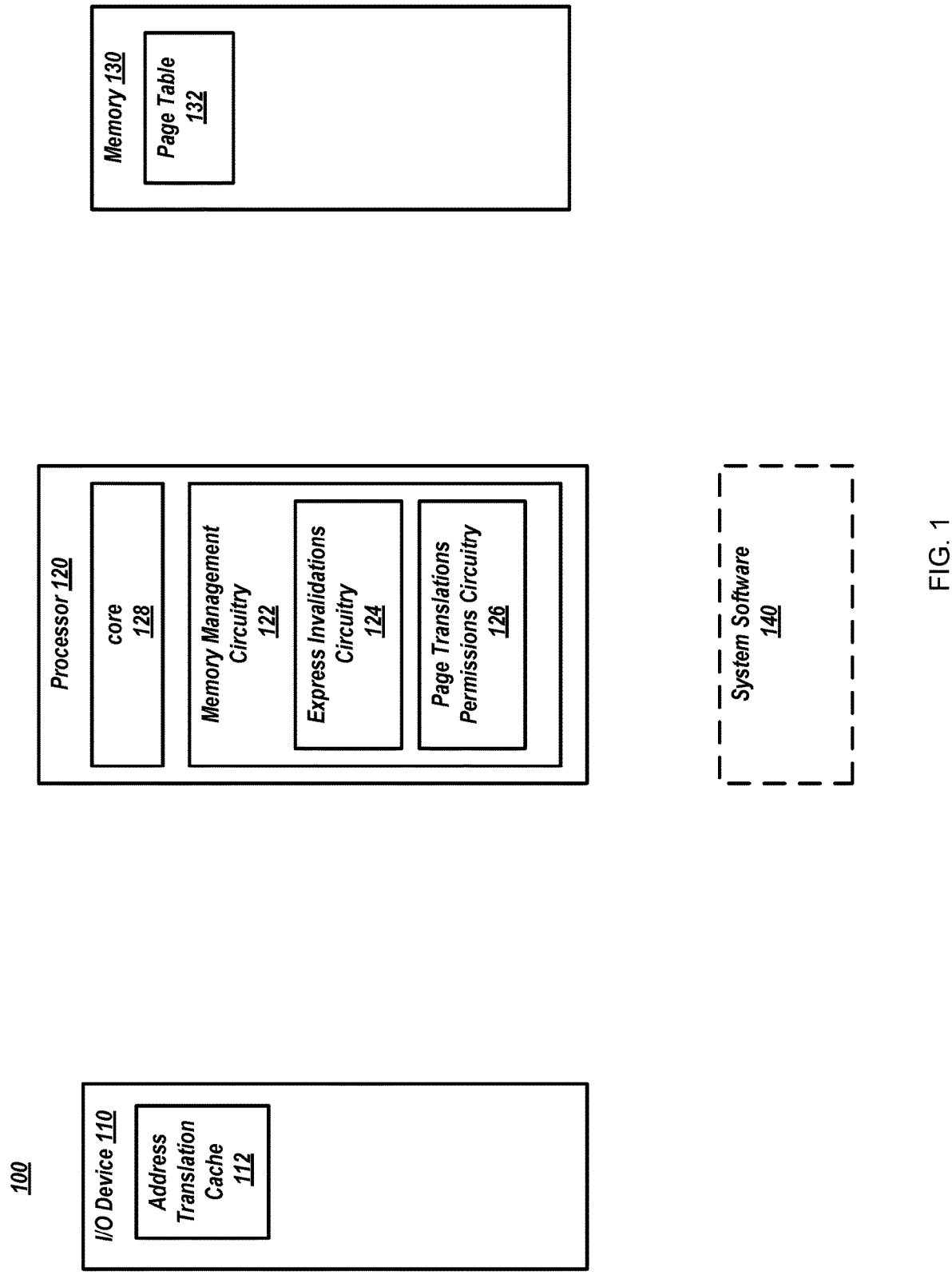
FIG. 1 is a block diagram of a system including an I/O device (supporting page faults), a processor, memory and systems software coupled together according to an embodiment.

In some instances it may be desirable to pause incoming traffic from input/output (I/O) devices. For example, it may be desirable to pause I/O device traffic to memory when the system's memory capacity or bandwidth is completely consumed (e.g., memory is fully exhausted (or close to fully exhausted) or bandwidth is congested).

In some conventional systems, the traffic of the entire system may be stopped (including all cores and all I/O devices). However, these systems do not allow for selective pausing of incoming I/O traffic and also do not allow for cleanly resuming traffic. For example, some conventional systems pause or quiesce an entire system by preventing all traffic sources (e.g., cores and I/O devices) from issuing memory accesses. More specifically, in some conventional systems, for example, the traffic may be stopped for reliability, availability, and serviceability (RAS) reasons during a physical central processing unit (CPU) hot-plug that requires changing the system's address decoding information (SAD/TAD rules).

Some conventional communication protocols also support a link quiescing feature that stops the traffic at the link level. This is achieved by back pressuring the device and slowing down direct memory access (DMA) traffic. These can often cause device errors or in the worst case might cause the system to shut down. Additionally, in some conventional communication protocols, traffic through Peripheral Component Interconnect Express (PCIe) links for I/O devices in particular could be stopped when poisoned data is encountered (e.g. Stop and Scream), but it only applies to error conditions.

The conventional solutions mentioned above control the traffic in an entire system and do not provide for selective control of I/O devices. For example, when quiescing a system for RAS reasons even the processor cores are unable to generate memory accesses, therefore the system software cannot execute while quiescing is in effect. In case of Stop and Scream for an I/O device, the device's normal operation cannot be resumed afterwards and the system might fail as a result. Thus, there is a need for allowing system software continuing to execute during pausing of an I/O device, and allowing the I/O device to resume normal operation after the pause state is lifted.

Accordingly, various embodiments described herein prevent I/O devices that support page faults from receiving new page translations or using existing cached page translations. This revokes access to physical pages by the device even though system page tables have granted access and also invalidates any information that devices might have cached to allow access to the physical page. Lack of permission to access a page forces the I/O devices to incur a page fault which results in the inability to issue memory accesses until the system software satisfies the page fault request and provides necessary permission.

In various embodiments described herein, changes are not required to the I/O devices, their device drivers, or in the communication protocol they use to connect to the rest of the system. For example, no new functionality is added to the devices or to the PCIe protocol.

In various embodiments described herein, a processing device includes a core to execute instructions, and memory management circuitry (unit) coupled to, memory, the core and an I/O device that supports page faults. The memory management circuitry includes an express invalidations circuitry, and a page translation permission circuitry. The memory management circuitry is to, while the core is executing the instructions, receive a command to pause communication between the I/O device and the memory, and in response to receiving the command to pause the communication, modify permissions of page translations that are sent to the I/O device by the page translation permission circuitry. Additionally, the memory management circuitry is to transmit an invalidation request, by the express invalidations circuitry to the I/O device, to invalidate cached page translations in the I/O device, forcing it to ask for page translation information. That is, to refuse to give the device further permission to access memory, hence effectively pausing the device.

FIG. 1 depicts processing system 100 that includes I/O device 110, processor 120, memory 130 and system software 140. In some embodiments, I/O device 110 is coupled to processor 120 and memory 130. Additionally, systems software 140 is coupled to processor 120 (including memory management circuitry 122), memory 130 and I/O device 110.

In various embodiments, system 100 includes more than one I/O device. In some embodiments, system 100 includes one or more I/O devices that support page faults. Additionally, in some embodiments, system 100 includes one or more I/O devices that do not support page faults, and one or more I/O devices that support page faults.

Processor 120 includes core 128. Alternatively, processor 120 can include more than one core. Processor 120 also includes memory management circuitry 122. In one embodiment, memory management circuitry 122 is an I/O Memory Management Unit (IOMMU). Memory management circuitry 122 includes express invalidations circuitry 124 and page translations permissions circuitry 126, which will be described in further detail below.

Memory 130 includes page tables 132. Page tables 132 include the mapping between virtual address and physical address. Additionally, the page tables include permissions (e.g., read/write access) associated with the pages.

I/O device 110, in one embodiment, supports page faults. I/O devices that support page faults use virtual, guest physical, or I/O virtual addresses, and request services from the IOMMU to translate the address into a physical address (also known as host physical address). Such devices cache the results obtained from the IOMMU in translation cache (e.g., address translation cache 112), which is also referred to as the DevTLB. The PCIe specification uses the term "ATC"—Address Translation Cache). The DevTLB uses mechanisms described by PCIe's Address Translation Service to communicate with the IOMMU. When a device is ready to issue a direct memory access (DMA), it looks up the DevTLB.

According to the current PCIe specification, if the device finds the particular translation and access permissions are available, the device issues the DMA towards the root complex. If the translation is not present, the device issues an address translation request towards the IOMMU, which sends an address translation response back to the I/O device. If the response has the required permissions, the device will cache the result in its DevTLB and subsequent access to the pages can use the information from DevTLB (as long as they have similar permission requirements). If the translation response from the IOMMU or from the DevTLB lookup does not have the required permissions, the I/O device sends a page fault request to the system software via the IOMMU. After receiving a successful response from system software, the device can retry the transaction which caused the initial page fault.

Systems software 140, in one embodiment, is an operating system (OS). In another embodiment, system software 140 is a hypervisor when system 100 implements a virtual computing system.

Figure 2:
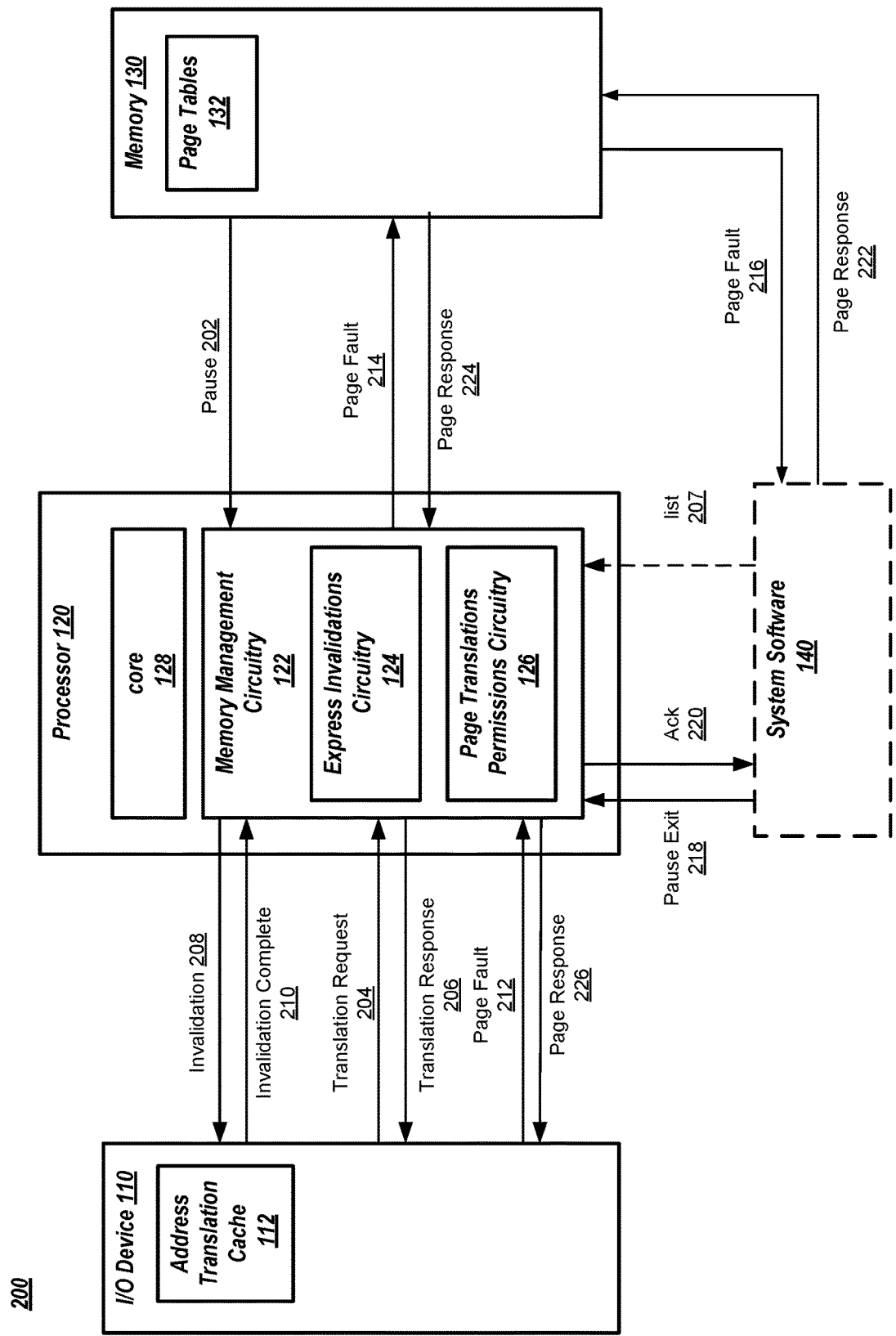
FIG. 2 is a flow chart of a method for pausing communication from an I/O device supporting page faults according to an embodiment.

FIG. 2 depicts a method 200 for pausing of an I/O device system (while system software continues to execute), and allowing the I/O device to resume normal operation after the pause state is lifted. In other words, method 200 is able to be performed while core 128 executes instructions (or is able to execute instructions).

At step 202, memory management circuitry 122 receives an I/O device pause request. The pause request, in one embodiment, can be generated by memory 130. Alternatively, the pause request can be generated by other parts of the system (e.g., system software). The pause request can be sent in response to various operational scenarios of the system. For example, the pause request is in response to the system's memory capacity or bandwidth is completely consumed (e.g., memory is fully exhausted (or close to fully exhausted) or bandwidth is congested). As will be described in further detail below, in response to the I/O device pause request (e.g., a request to put the I/O device in "pause mode"), memory management circuitry 122, among other things, suppresses permissions returned to I/O devices that support page faults. However, in some embodiments, memory management circuitry 122 will continue to service address translation requests from other I/O devices that do not support page faults.

At step 204, I/O device 110 sends a translation request to memory management circuitry 122. In response to the pause request, page translation permissions circuitry (PTPC) 126 changes/revises permissions of the requested page when returning the response to the I/O device. As such, at step 206, the translation response includes modified or revised permissions of the page request. For example, PTPC 126 can change the permissions for read, write, or both types of transactions. More specifically, for example, a requested page has an original permission setting of write (and/or read) in page table 132. During the translation, PTPC 126 modifies the permission of the requested page to no permission or read permission. As a result, the memory management circuitry can selectively pause read or write or both kinds of memory transactions. The current PCIe specification does not include the structure/functionality of PTPC 126. In particular, EIC 124 is separate and distinct from any page translation functionality that is supported by the current PCIe specification.

In one embodiment, at step 207, a list of I/O devices that supports page faults in system 100 is determined by system software 140 and sent to express invalidations circuitry (EIC) 124. As such, in response to receiving I/O pause request at step 202, EIC 124 looks up the list provided by system software 140 and automatically sends invalidation requests to any I/O device that supports page faults in system 100. In such an embodiment, the system software may not be able to transmit the device list during some system conditions (e.g., memory congestion) that trigger the I/O pause request. As such, it is beneficial to transmit the device list to EIC 124 prior to the occurrence of a system condition that triggers the I/O pause request, for example, at the times that I/O devices are initialized or enumerated.

In various embodiments, the IOMMU gains knowledge of which DevTLBs in the platform support I/O page faults by other means. For example, at run time, system software keeps an accurate list of active DevTLBs that can support page-fault and the IOMMU reads this list as part of entry into "Pause I/O" mode. In another example, the IOMMU hardware infers existence of active DevTLBs by observing traffic pattern passing through it.

At step 208, EIC 124 transmits an invalidation request to I/O device 110. For example, in response to the I/O pause request, EIC 124 issues DevTLB invalidations to the I/O device (e.g., any I/O device that supports page faults). The invalidation request forces the I/O device to remove any previously cached translations. It is noted that the structure and functionality of EIC 124 is not a part of the current PCIe specification. In particular, EIC 124 is separate and distinct from any invalidation functionality that is supported by the current PCIe specification.

At step 210, memory management circuitry 122 receives an acknowledgment from I/O device 110 that the invalidation request is complete. For example, the I/O device serviced the invalidation request and purged the contents of its cache.

At step 212, I/O device 110 requests a page fault (towards page tables 132 in memory 130) because the translation response and the DevTLB lookup did not have the proper permissions. When I/O device 110 sends a page fault request, I/O device 110 pauses communication (e.g., memory access requests) until it receives the appropriate response from memory management circuitry 122. The page fault request is then transmitted from memory management circuitry to memory (step 214) and from memory 130 to system software 140 (step 216). For example, system software 140 reads the page fault request from system memory.

At step 218, system software 140 transmits a pause exit command to memory management circuitry 122. In some embodiments, system software 140 resolves the issue (e.g., memory is fully exhausted (or close to fully exhausted) or bandwidth is congested) of the system that triggered the pause command (step 202). After resolving the system issue (that triggered the pause command), system software 140 transmits the pause exit command. At step 220, memory management circuitry 122 sends an acknowledgement that the pause exit command was received.

At step 222, system software 140 returns the information to memory 130, and from memory 130 to memory management circuitry 122 (step 224) and from memory management circuitry 122 to I/O device 110 (step 226).

As a result of exiting the pause mode, memory management circuitry 122 stops the practice of reducing/revoking access permissions found in the page tables back to the I/O device (step 206). Memory management circuitry 122 resumes normal operation and provides the actual permissions found in page tables 132 back to I/O device 110. Additionally, system software 140 resumes normal operation and returns successful responses to page faults submitted by I/O device 110. Accordingly, I/O device 110 (or any other I/O device that supports page faults) will retry its memory accesses and retrieve necessary translations and permission access to the page in memory, allowing it to continue with its memory transactions.

FIG. 3 is a flow chart of a method 300 for pausing communication from an I/O device supporting page faults according to one embodiment. At step 310, while a core is executing instructions, the memory management circuitry 122 receives, from memory 130, a command to pause communication between an I/O device that supports page faults. For example, while core 128 is executing instructions (e.g., core is not quiesced for RAS reasons), memory management circuitry 122 receives a pause command to place I/O devices supporting page faults (e.g., I/O device 110) in a pause mode (e.g., pause command—step 202 of FIG. 2). As discussed above, core 128 is able to process instructions, such as processing application instructions, in a normal fashion concurrent to the I/O device being placed in a paused state. In other words, the processing of instructions by core 128 is not required to be paused or halted, based on (or in response to) the pausing of communication between the I/O device and memory.

At 320, in response to memory management circuitry 122 receiving the pause command to pause the communication, (1) permissions of page translations are modified by PTPC 126, and (2) an invalidation request to invalidate cached page translations in the I/O device is transmitted from EIC 124 to I/O device 110. For example, upon memory management circuitry 122 receiving the pause command from memory 130, PTPC 126 modifies/revokes permissions when I/O device 110 requests pages. Additionally, upon memory management circuitry 122 receiving the pause command from memory 130, EIC 124 sends an invalidation request to invalidate cached page translations residing in address translation cache 112 (e.g., invalidation—step 208 of FIG. 2).

At 330, in one embodiment, the page translations comprising the modified permissions are transmitted to the I/O device. For example, a translation response including the modified permissions is transmitted to from PTPC 126 to I/O device 110 (e.g., translation response—step 206 of FIG. 2).

At 340, in one embodiment, system software 140 forgoes transmitting a response to a page fault request from I/O device 110. For example, system software 140 forgoes a response to a page fault request (e.g., page fault request—step 212 of FIG. 2) from I/O device 110. In other words, system software 140 delays its response until the system software gets a chance to address the system level issue causing the I/O pause and does not completely ignore the page fault request. In doing so, the I/O device (e.g., I/O device 110) pauses communication to memory 130 until the system software resolves the system issue that caused the pause command and returns the response to the page fault request.

At 350, in one embodiment, a command to exit the pause of the communication between the I/O device and the memory is received. For example, system software 140 resolves the system issue that caused the pause command. Subsequent to the resolving of the issue, system software transmits a pause exit command (e.g., step 218) to memory management circuitry 122. As a result, the communication between the I/O device 110 and memory 130 is no longer paused.

FIG. 4A is a block diagram illustrating a micro-architecture for a processor 400 (e.g., processor 120) that implements the processing device including heterogeneous cores (e.g., core 128) in accordance with one embodiment of the disclosure. Specifically, processor 400 depicts an in-order architecture core and a register renaming logic, out-of-order issue/execution logic to be included in a processor according to at least one embodiment of the disclosure.

Processor 400 includes a front end unit 430 coupled to an execution engine unit 450, and both are coupled to a memory unit 470 (e.g., memory 130). The processor 400 may include a reduced instruction set computing (RISC) core, a complex instruction set computing (CISC) core, a very long instruction word (VLIW) core, or a hybrid or alternative core type. As yet another option, processor 400 may include a special-purpose core, such as, for example, a network or communication core, compression engine, graphics core, or the like. In one embodiment, processor 400 may be a multi-core processor or may be part of a multi-processor system.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 440 may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations (RS), central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 400 may be the same as processor 120 as described with respect to FIGS. 1 and 2. In particular, processor 400 may include processing core 128 shown in FIGS. 1 and 2.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/ packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which may include a data prefetcher 480, a data TLB unit 472, a data cache unit (DCU) 474, and a level 2 (L2) cache unit 476, to name a few examples. In some embodiments DCU 474 is also known as a first level data cache (L1 cache). The DCU 474 may handle multiple outstanding cache misses and continue to service incoming stores and loads. It also supports maintaining cache coherency. The data TLB unit 472 is a cache used to improve virtual address translation speed by mapping virtual and physical address spaces. In one exemplary embodiment, the memory access units 464 may include a load unit, a store address unit, and a store data unit, each of which is coupled to the data TLB unit 472 in the memory unit 470. The L2 cache unit 476 may be coupled to one or more other levels of cache and eventually to a main memory.

In one embodiment, the data prefetcher 480 speculatively loads/prefetches data to the DCU 474 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 400 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 4B is a block diagram illustrating an in-order pipeline and a register renaming stage, out-of-order issue/execution pipeline implemented by processor 400 of FIG. 4A according to some embodiments of the disclosure. The solid lined boxes in FIG. 4B illustrate an in-order pipeline, while the dashed lined boxes illustrates a register renaming, out-of-order issue/execution pipeline. In FIG. 4B, a processor 400 as a pipeline includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424. In some embodiments, the ordering of stages 402-424 may be different than illustrated and are not limited to the specific ordering shown in FIG. 4B.

Figure 5:
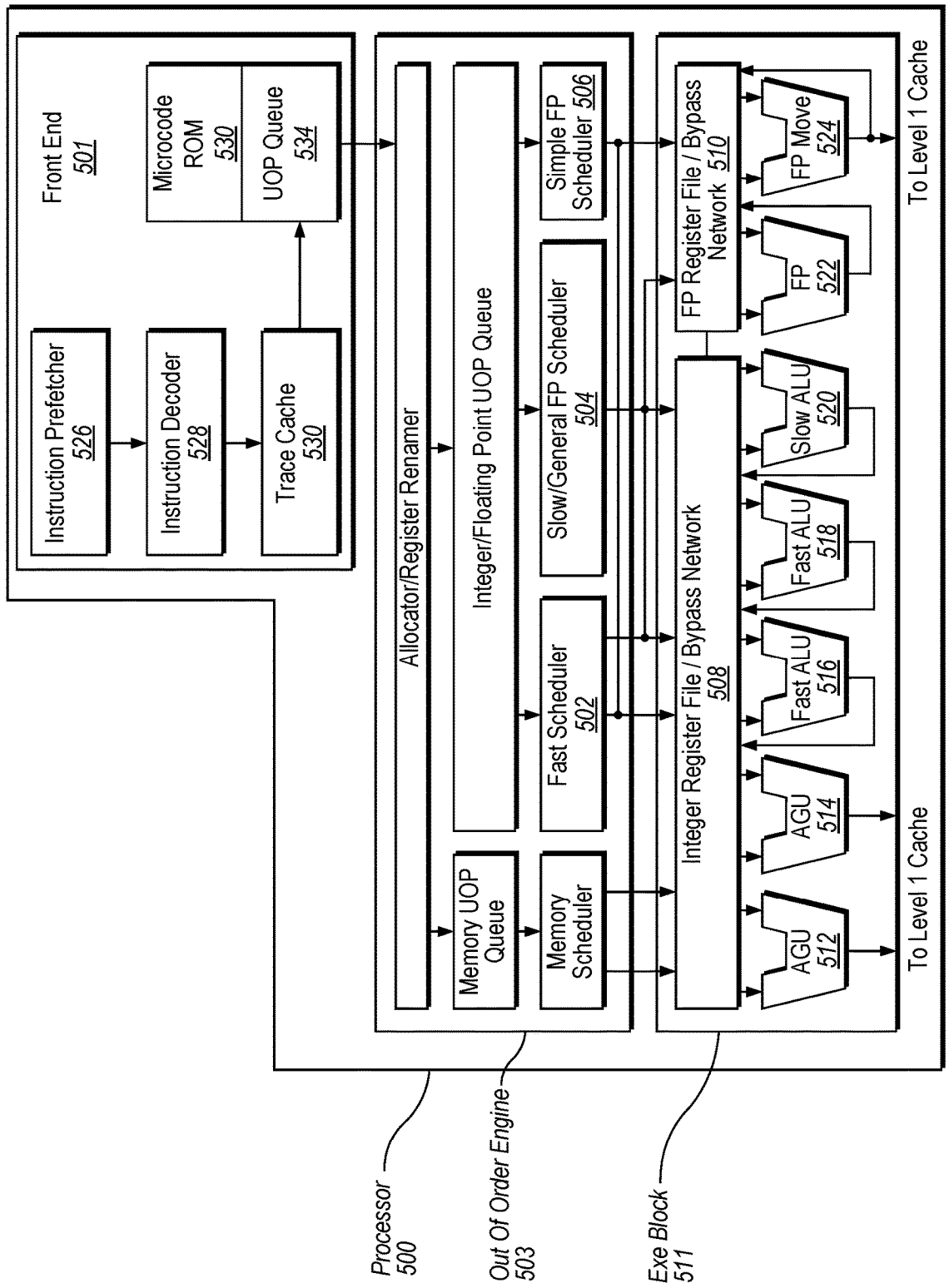
FIG. 5 is a block diagram illustrating a micro-architecture for a processor in accordance with one embodiment of the disclosure.

FIG. 5 illustrates a block diagram of the micro-architecture for a processor 500 (e.g., processor 120) that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 501 may include several units. In one embodiment, the instruction prefetcher 526 fetches instructions from memory and feeds them to an instruction decoder 528 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 530 takes decoded uops and assembles them into program ordered sequences or traces in the uop queue 534 for execution. When the trace cache 530 encounters a complex instruction, the microcode ROM 532 provides the uops needed to complete the operation.

Some instructions are converted into a single micro-op, whereas others need several micro-ops to complete the full operation. In one embodiment, if more than four micro-ops are needed to complete an instruction, the decoder 528 accesses the microcode ROM 532 to do the instruction. For one embodiment, an instruction can be decoded into a small number of micro ops for processing at the instruction decoder 528. In another embodiment, an instruction can be stored within the microcode ROM 532 should a number of micro-ops be needed to accomplish the operation. The trace cache 530 refers to an entry point programmable logic array (PLA) to determine a correct micro-instruction pointer for reading the micro-code sequences to complete one or more instructions in accordance with one embodiment from the micro-code ROM 532. After the microcode ROM 532 finishes sequencing micro-ops for an instruction, the front end 501 of the machine resumes fetching micro-ops from the trace cache 530.

The out-of-order execution engine 503 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 502, slow/general floating point scheduler 504, and simple floating point scheduler 506. The uop schedulers 502, 504, 506, determine when a uop is ready to execute based on the readiness of their dependent input register operand sources and the availability of the execution resources the uops need to complete their operation. The fast scheduler 502 of one embodiment can schedule on each half of the main clock cycle while the other schedulers can only schedule once per main processor clock cycle. The schedulers arbitrate for the dispatch ports to schedule uops for execution.

Register files 508, 510, sit between the schedulers 502, 504, 506, and the execution units 512, 514, 516, 518, 520, 522, 524 in the execution block 511. There is a separate register file 508, 510, for integer and floating point operations, respectively. Each register file 508, 510, of one embodiment also includes a bypass network that can bypass or forward just completed results that have not yet been written into the register file to new dependent uops. The integer register file 508 and the floating point register file 510 are also capable of communicating data with the other. For one embodiment, the integer register file 508 is split into two separate register files, one register file for the low order 32 bits of data and a second register file for the high order 32 bits of data. The floating point register file 510 of one embodiment has 128 bit wide entries because floating point instructions typically have operands from 54 to 128 bits in width.

The execution block 511 contains the execution units 512, 514, 516, 518, 520, 522, 524, where the instructions are actually executed. This section includes the register files 508, 510, that store the integer and floating point data operand values that the micro-instructions need to execute. The processor 500 of one embodiment is comprised of a number of execution units: address generation unit (AGU) 512, AGU 514, fast ALU 516, fast ALU 518, slow ALU 520, floating point ALU 522, floating point move unit 524. For one embodiment, the floating point execution blocks 522, 524, execute floating point, MMX, SIMD, and SSE, or other operations. The floating point ALU 522 of one embodiment includes a 54 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 516, 518. The fast ALUs 516, 518, of one embodiment can execute fast operations with an effective latency of half a clock cycle. For one embodiment, most complex integer operations go to the slow ALU 520 as the slow ALU 520 includes integer execution hardware for long latency type of operations, such as a multiplier, shifts, flag logic, and branch processing. Memory load/store operations are executed by the AGUs 512, 514. For one embodiment, the integer ALUs 516, 518, 520, are described in the context of performing integer operations on 64 bit data operands. In alternative embodiments, the ALUs 516, 518, 520, can be implemented to support a variety of data bits including 16, 32, 128, 256, etc. Similarly, the floating point units 522, 524, can be implemented to support a range of operands having bits of various widths. For one embodiment, the floating point units 522, 524, can operate on 128 bits wide packed data operands in conjunction with SIMD and multimedia instructions.

In one embodiment, the uops schedulers 502, 504, 506, dispatch dependent operations before the parent load has finished executing. As uops are speculatively scheduled and executed in processor 500, the processor 500 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 500 also includes logic to implement store address prediction for memory disambiguation according to embodiments of the disclosure. In one embodiment, the execution block 511 of processor 500 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 6:
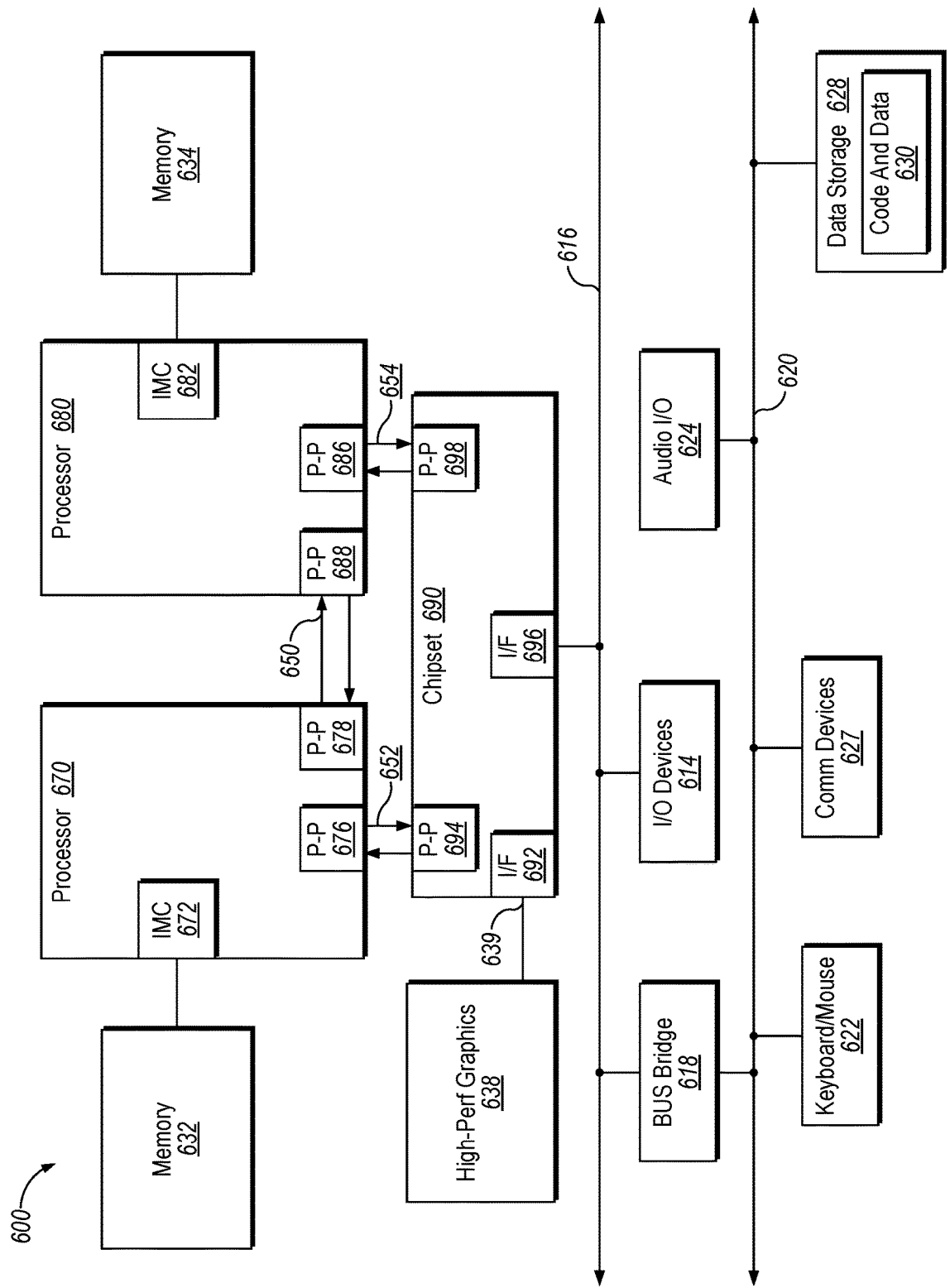
FIG. 6 is a block diagram illustrating a system in which an embodiment of the disclosure may be used.

Referring now to FIG. 6, shown is a block diagram illustrating a system 600 in which an embodiment of the disclosure may be used. As shown in FIG. 6, multiprocessor system 600 is a point-to-point interconnect system, and includes a first processor 670 (e.g., processor 120) and a second processor 680 coupled via a point-to-point interconnect 650. While shown with only two processors 670, 680, it is to be understood that the scope of embodiments of the disclosure is not so limited. In other embodiments, one or more additional processors may be present in a given processor. In one embodiment, the multiprocessor system 600 may implement hybrid cores as described herein.

Processors 670 and 680 are shown including integrated memory controller units 672 and 682, respectively. Processor 670 also includes as part of its bus controller units point-to-point (P-P) interfaces 676 and 678; similarly, second processor 680 includes P-P interfaces 686 and 688. Processors 670, 680 may exchange information via a point-to-point (P-P) interface 650 using P-P interface circuits 678, 688. As shown in FIG. 6, IMCs 672 and 682 couple the processors to respective memories, namely a memory 632 and a memory 634, which may be portions of main memory locally attached to the respective processors.

Processors 670, 680 may each exchange information with a chipset 690 via individual P-P interfaces 652, 654 using point to point interface circuits 676, 694, 686, 698. Chipset 690 may also exchange information with a high-performance graphics circuit 638 via a high-performance graphics interface 639.

A shared cache (not shown) may be included in either processor or outside of both processors, yet connected with the processors via P-P interconnect, such that either or both processors' local cache information may be stored in the shared cache if a processor is placed into a low power mode.

Chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the present disclosure is not so limited.

As shown in FIG. 6, various I/O devices 614 (e.g., I/O device 110) may be coupled to first bus 616, along with a bus bridge 618 which couples first bus 616 to a second bus 620. In one embodiment, second bus 620 may be a low pin count (LPC) bus. Various devices may be coupled to second bus 620 including, for example, a keyboard and/or mouse 622, communication devices 627 and a storage unit 628 such as a disk drive or other mass storage device which may include instructions/code and data 630, in one embodiment. Further, an audio I/O 624 may be coupled to second bus 620. Note that other architectures are possible. For example, instead of the point-to-point architecture of FIG. 6, a system may implement a multi-drop bus or other such architecture.

Figure 7:
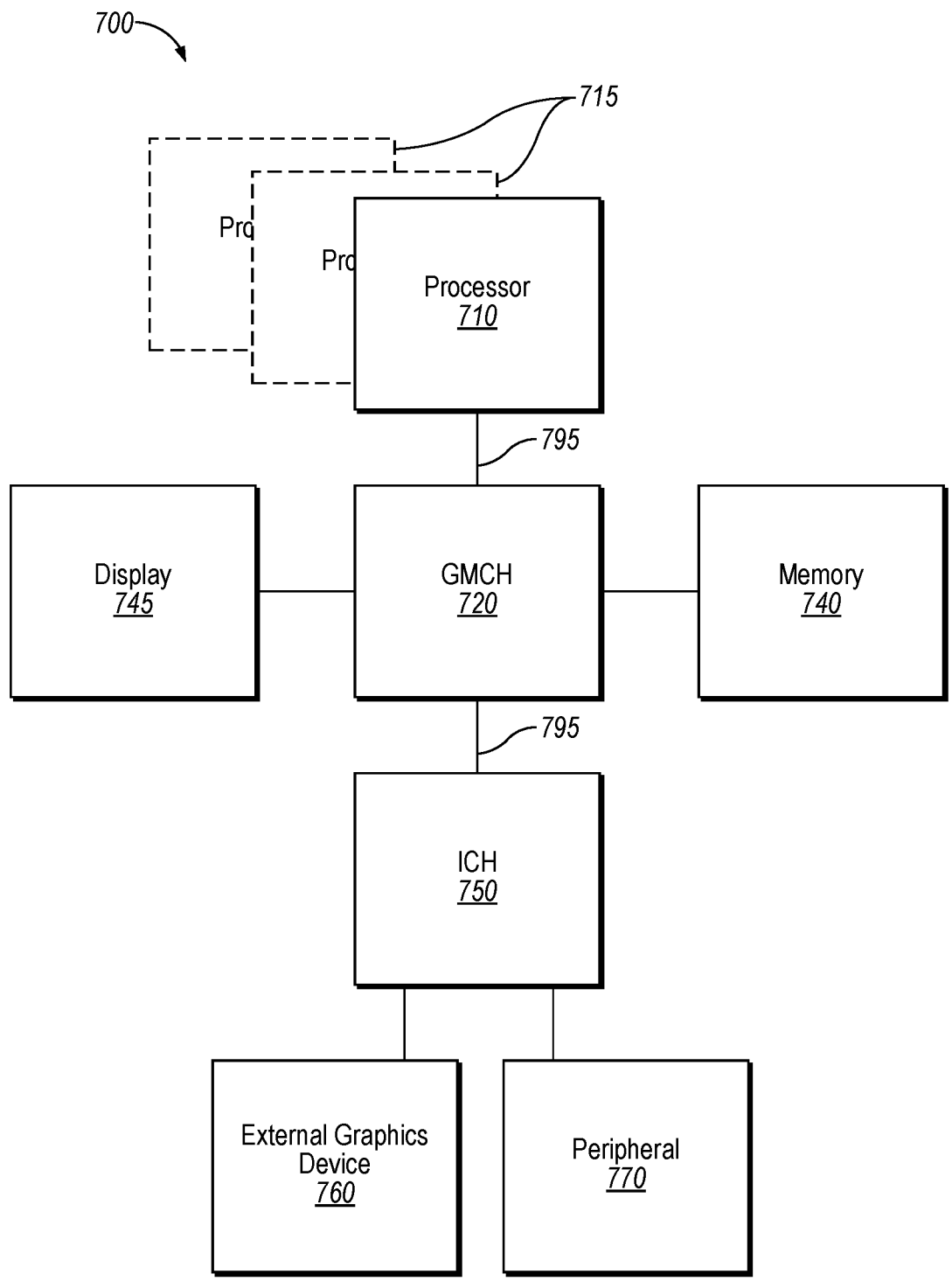
FIG. 7 is a block diagram illustrating a system in which an embodiment of the disclosure may operate.

Referring now to FIG. 7, shown is a block diagram of a system 700 in which one embodiment of the disclosure may operate. The system 700 may include one or more processors 710, 715 (e.g., processor 120), which are coupled to graphics memory controller hub (GMCH) 720. The optional nature of additional processors 715 is denoted in FIG. 7 with broken lines. In one embodiment, processors 710, 715 implement hybrid cores according to embodiments of the disclosure.

Each processor 710, 715 may be some version of the circuit, integrated circuit, processor, and/or silicon integrated circuit as described above. However, it should be noted that it is unlikely that integrated graphics logic and integrated memory control units would exist in the processors 710, 715. FIG. 7 illustrates that the GMCH 720 may be coupled to a memory 740 that may be, for example, a dynamic random access memory (DRAM). The DRAM may, for at least one embodiment, be associated with a non-volatile cache.

The GMCH 720 may be a chipset, or a portion of a chipset. The GMCH 720 may communicate with the processor(s) 710, 715 and control interaction between the processor(s) 710, 715 and memory 740. The GMCH 720 may also act as an accelerated bus interface between the processor(s) 710, 715 and other elements of the system 700. For at least one embodiment, the GMCH 720 communicates with the processor(s) 710, 715 via a multi-drop bus, such as a frontside bus (FSB) 795.

Furthermore, GMCH 720 is coupled to a display 745 (such as a flat panel or touchscreen display). GMCH 720 may include an integrated graphics accelerator. GMCH 720 is further coupled to an input/output (I/O) controller hub (ICH) 750, which may be used to couple various peripheral devices to system 700. Shown for example in the embodiment of FIG. 7 is an external graphics device 760, which may be a discrete graphics device, coupled to ICH 750, along with another peripheral device 770.

Alternatively, additional or different processors may also be present in the system 700. For example, additional processor(s) 715 may include additional processors(s) that are the same as processor 710, additional processor(s) that are heterogeneous or asymmetric to processor 710, accelerators (such as, e.g., graphics accelerators or digital signal processing (DSP) units), field programmable gate arrays, or any other processor. There can be a variety of differences between the processor(s) 710, 715 in terms of a spectrum of metrics of merit including architectural, micro-architectural, thermal, power consumption characteristics, and the like. These differences may effectively manifest themselves as asymmetry and heterogeneity amongst the processors 710, 715. For at least one embodiment, the various processors 710, 715 may reside in the same die package.

Figure 8:
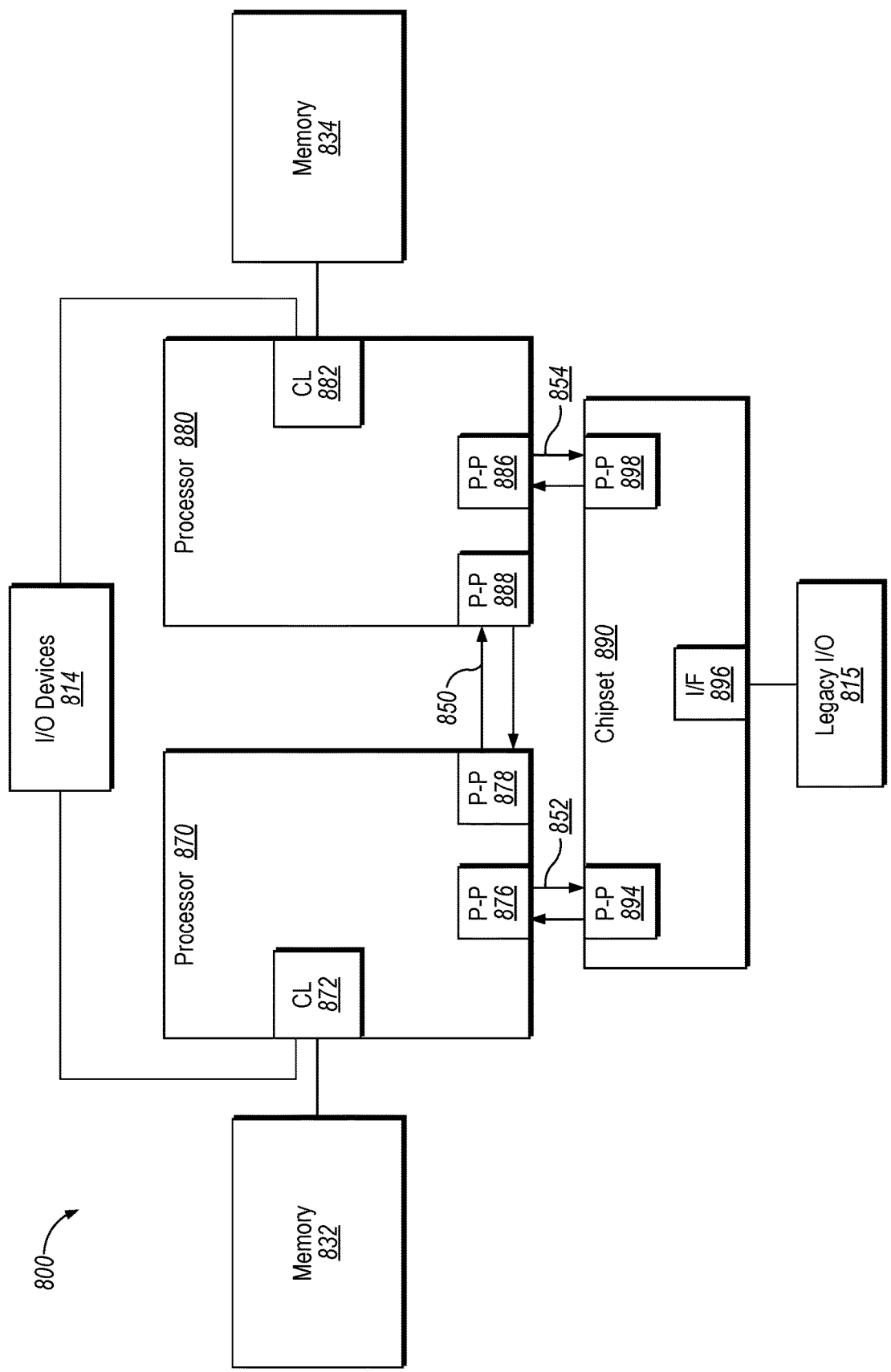
FIG. 8 is a block diagram illustrating a system in which an embodiment of the disclosure may operate.

Referring now to FIG. 8, shown is a block diagram of a system 800 in which an embodiment of the disclosure may operate. FIG. 8 illustrates processors 870, 880 (e.g., processor 120). In one embodiment, processors 870, 880 may implement hybrid cores as described above. Processors 870, 880 may include integrated memory and I/O control logic ("CL") 872 and 882, respectively and intercommunicate with each other via point-to-point interconnect 850 between point-to-point (P-P) interfaces 878 and 888 respectively. Processors 870, 880 each communicate with chipset 890 via point-to-point interconnects 852 and 854 through the respective P-P interfaces 876 to 894 and 886 to 898 as shown. For at least one embodiment, the CL 872, 882 may include integrated memory controller units. CLs 872, 882 may include I/O control logic. As depicted, memories 832, 834 (e.g., memory 130) coupled to CLs 872, 882 and I/O devices 814 (e.g., I/O device 110) are also coupled to the control logic 872, 882. Legacy I/O devices 815 are coupled to the chipset 890 via interface 996.

Figure 9:
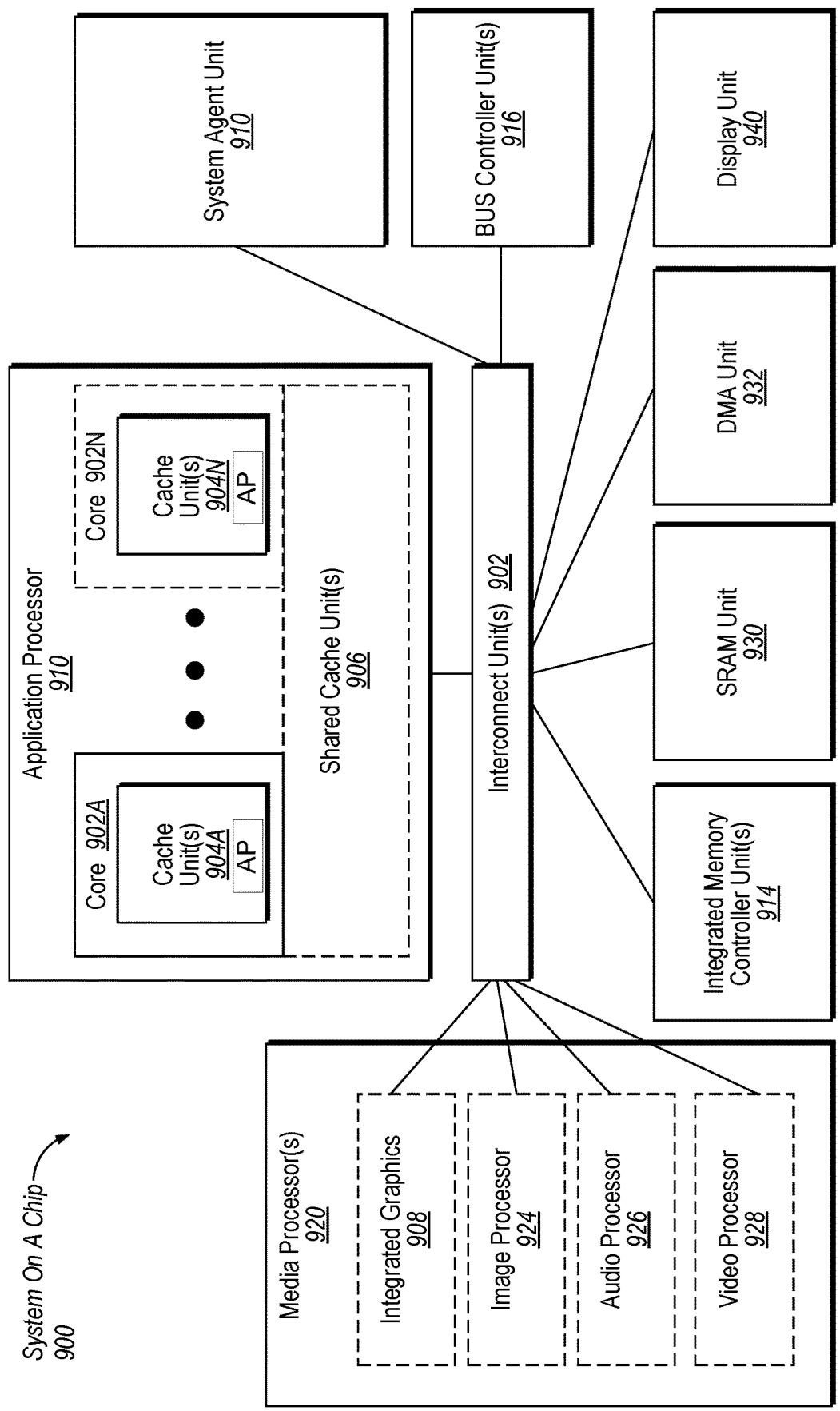
FIG. 9 is a block diagram illustrating a System-on-a-Chip (SoC) according to an embodiment of the disclosure.

Embodiments may be implemented in many different system types. FIG. 9 is a block diagram of a SoC 900 in accordance with an embodiment of the present disclosure. Dashed lined boxes are optional features on more advanced SoCs. In some implementations, SoC 900 as shown in FIG. 9 includes features of the system 100 as shown in FIG. 1. In FIG. 9, an interconnect unit(s) 912 is coupled to: an application processor 920 (e.g., processor 120) which includes a set of one or more cores 902A-N and shared cache unit(s) 906; a system agent unit 910; a bus controller unit(s) 916; an integrated memory controller unit(s) 914; a set or one or more media processors 918 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays. In one embodiment, a memory module may be included in the integrated memory controller unit(s) 914. In another embodiment, the memory module may be included in one or more other components of the SoC 900 that may be used to access and/or control a memory. The application processor 920 may include a store address predictor for implementing hybrid cores as described in embodiments herein.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture and/or instruction set. For example, some of the cores 902A-N may be in order while others are out-of-order. As another example, two or more of the cores 902A-N may be capable of execution the same instruction set, while others may be capable of executing only a subset of that instruction set or a different instruction set.

The application processor 920 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 920 may be from another company, such as ARM Holdings™, Ltd, MIPS™, etc. The application processor 920 may be a special-purpose processor, such as, for example, a network or communication processor, compression engine, graphics processor, co-processor, embedded processor, or the like. The application processor 920 may be implemented on one or more chips. The application processor 920 may be a part of and/or may be implemented on one or more substrates using any of a number of process technologies, such as, for example, BiCMOS, CMOS, or NMOS.

Figure 10:
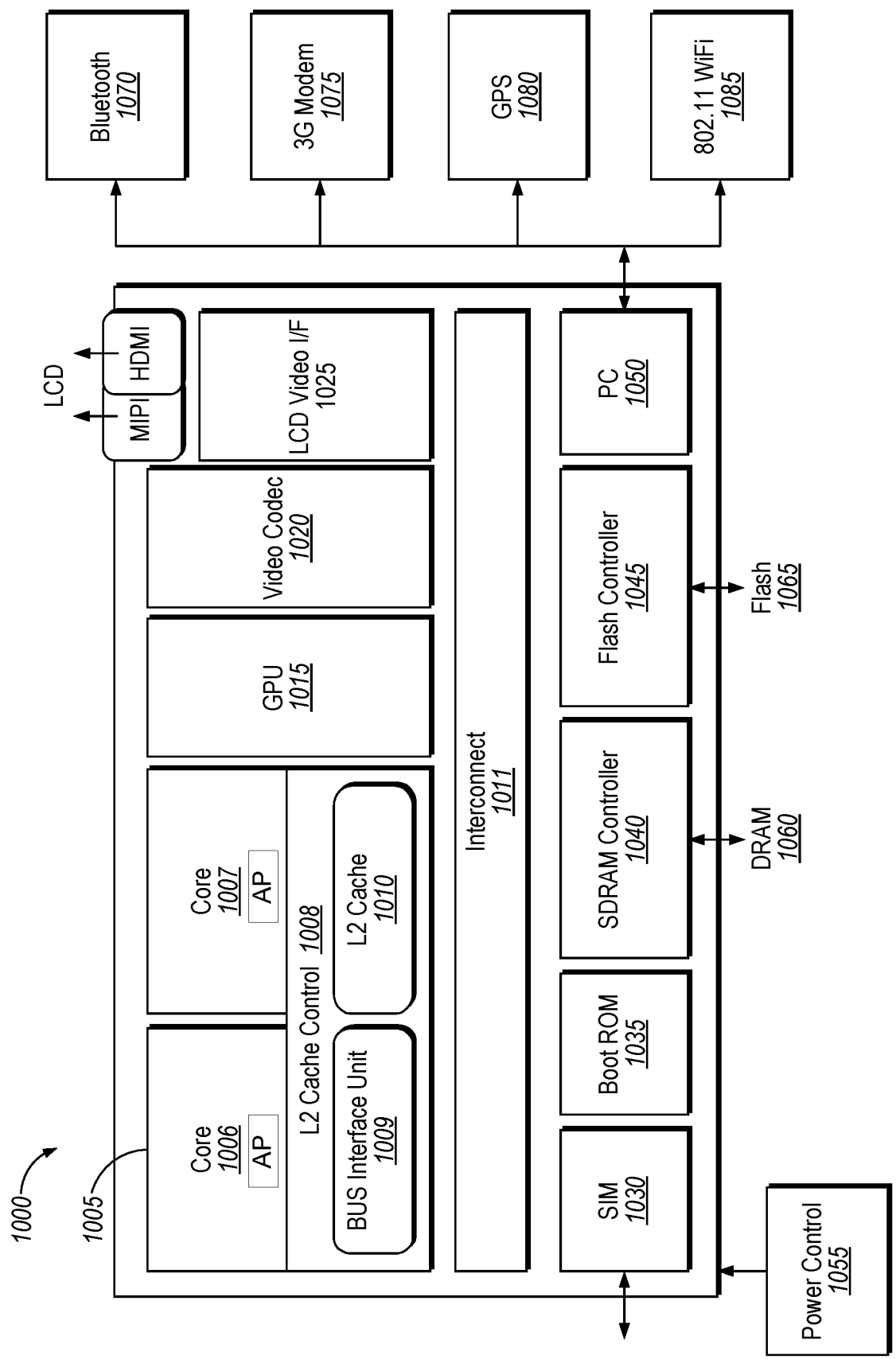
FIG. 10 is a block diagram illustrating a SoC design according to an embodiment of the disclosure.

FIG. 10 is a block diagram of an embodiment of a system on-chip (SoC) design in accordance with the present disclosure. As a specific illustrative example, SoC 1000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1000 includes 2 cores-1006 and 1007 (e.g., core 128). Cores 1006 and 1007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of system 1000. Interconnect 1011 includes an on-chip interconnect, such as an IOSF, AMBA, or other interconnect discussed above, which potentially implements one or more aspects of the described disclosure. In one embodiment, cores 1006, 1007 may implement hybrid cores as described in embodiments herein.

Interconnect 1011 provides communication channels to the other components, such as a Subscriber Identity Module (SIM) 1030 to interface with a SIM card, a boot ROM 1035 to hold boot code for execution by cores 1006 and 1007 to initialize and boot SoC 1000, a SDRAM controller 1040 to interface with external memory (e.g. DRAM 1060), a flash controller 1045 to interface with non-volatile memory (e.g. Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the disclosure described herein. In addition, the system 1000 illustrates peripherals for communication, such as a Bluetooth module 1070, 3G modem 1075, GPS 1080, and Wi-Fi 1085.

Figure 11:
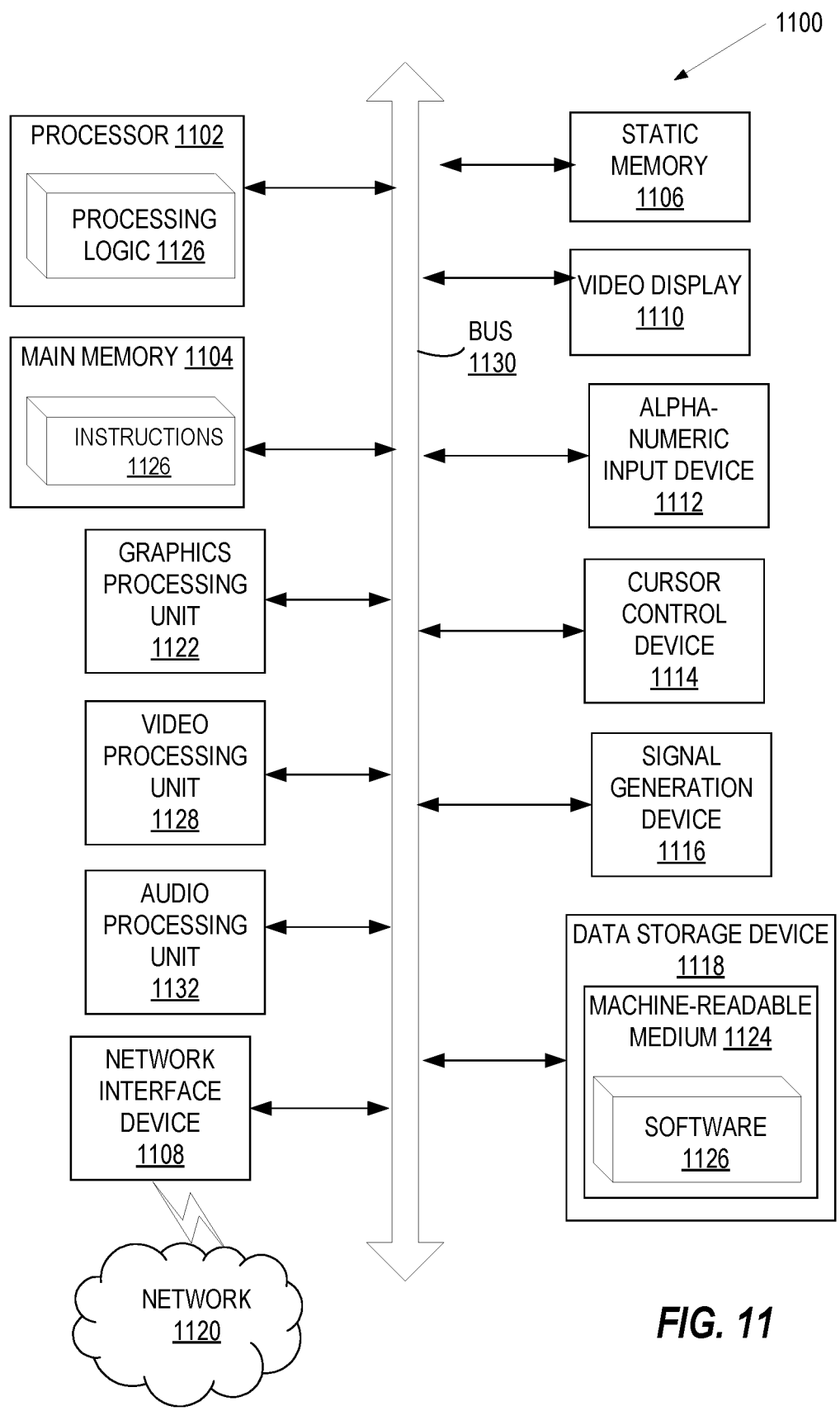
FIG. 11 illustrates a block diagram illustrating a computer system according to an embodiment of the disclosure.

FIG. 11 illustrates a diagrammatic representation of a machine in the example form of a computer system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1100 includes a processing device 1102 (e.g., processor 120), a main memory 1104 (e.g., read-only memory (ROM), flash memory, dynamic random access memory (DRAM) (such as synchronous DRAM (SDRAM) or DRAM (RDRAM), etc.), such memory 130, a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. In one embodiment, processing device 1102 may include one or more processing cores. The processing device 1102 is configured to execute the processing logic 1126 for performing the operations and steps discussed herein. For example, processing logic 1126 may perform operations as described in FIG. 3. In one embodiment, processing device 1102 is the same as processor 120 described with respect to FIGS. 1 and 2 as described herein with embodiments of the disclosure.

The computer system 1100 may further include a network interface device 1108 communicably coupled to a network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker). Furthermore, computer system 1100 may include a graphics processing unit 1122, a video processing unit 1128, and an audio processing unit 1132.

The data storage device 1118 may include a machine-accessible storage medium 1124 on which is stored software 1126 implementing any one or more of the methodologies of functions described herein, such as implementing store address prediction for memory disambiguation as described above. The software 1126 may also reside, completely or at least partially, within the main memory 1104 as instructions 1126 and/or within the processing device 1102 as processing logic 1126 during execution thereof by the computer system 1100; the main memory 1104 and the processing device 1102 also constituting machine-accessible storage media.

The machine-readable storage medium 1124 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments.

Example 1 is processing device comprising 1) a core to execute instructions; and 2) memory management circuitry coupled to, memory, the core and an I/O device that supports page faults, the memory management circuitry comprising an express invalidations controller; and a page translation permission controller, wherein the memory management circuitry is to: a) while the core is executing the instructions: b) receive instructions to pause communication between the I/O device and the memory; and c) in response to receiving the instructions to pause the communication: modify permissions of page translation responses by the page translation permission controller; and transmit an invalidation request, by the express invalidations controller to the I/O device, to cause cached page translations in the I/O device to be invalidated.

In Example 2, the processing device of Example 1, wherein the memory management circuitry is further to transmit the page translations comprising the modified permissions to the I/O device.

In Example 3, the processing device of Example 1, wherein the memory management circuitry is further to forgo transmitting a response to a page fault request from the I/O device.

In Example 4, the processing device of Example 1, wherein the memory management circuitry is further to receive a command to exit the pause of the communication between the I/O device and the memory.

In Example 5, the processing device of Example 4, wherein the memory management circuitry is further to: in response to receiving the command to exit the pause of the communication, transmit requested page translations to the I/O device.

In Example 6, the processing device of Example 4, wherein the memory management circuitry is further to: in response to receiving the command to exit the pause of the communication, transmit a response to a page fault request from the I/O device.

In Example 7, the processing device of Example 4, wherein the memory management circuitry receives the command to exit the pause of the communication from systems software.

In Example 8, the processing device of Example 1, wherein the memory management circuitry receives the command to pause the communication from the memory.

Various implementations may have different combinations of the structural features described above. For instance, all optional features of the processors and methods described above may also be implemented with respect to a system described herein and specifics in the examples may be used anywhere in one or more implementations Example 9 is a processing system comprising: 1) a core to execute instructions; 2) memory coupled to the core; and 3) memory management circuitry coupled to, the memory, the core and an I/O device that supports page faults, the memory management circuitry comprising: an express invalidations controller; and a page translation permission controller, wherein the memory management circuitry is to: a) while the core is executing the instructions: b) receive instructions to pause communication between the I/O device and the memory; and c) in response to receiving the instructions to pause the communication: modify permissions of page translations responses by the page translation permission controller; and transmit an invalidation request, by the express invalidations controller to the I/O device, to cause cached page translations in the I/O device to be invalidated.

In example 10, the processing system of Example 9 wherein the memory management circuitry is further to: transmit the page translations comprising the modified permissions to the I/O device.

In example 11, the processing system of Example 9 wherein the memory management circuitry is further to: forgo transmitting a response to a page fault request from the I/O device.

In example 12 The processing system of Example 9, wherein the memory management circuitry is further to: receive a command to exit the pause of the communication between the I/O device and the memory.

In example 13, the processing system of Example 12 wherein the memory management circuitry is further to: in response to receiving the command to exit the pause of the communication, transmit requested page translations to the I/O device.

In example 14, the processing system of Example 12 wherein the memory management circuitry is further to: in response to receiving the command to exit the pause of the communication, transmit a response to a page fault request from the I/O device.

In example 15, the processing system of Example 12 wherein the memory management circuitry receives the command to exit the pause of the communication from systems software.

In example 16, the processing system of Example 9 wherein the memory management circuitry receives the command to pause the communication from the memory.

Various implementations may have different combinations of the structural features described above. For instance, all optional features of the processors and methods described above may also be implemented with respect to a system described herein and specifics in the examples may be used anywhere in one or more implementations Example 17 is a method for pausing communication from an I/O device supporting page faults, comprising 1) while a core is executing instructions: 2) receiving instructions to pause communication between an I/O device that supports page faults and memory; and 3) in response to receiving the instructions to pause the communication: a) modifying permissions of page translation responses; and b) transmitting, to the I/O device, an invalidation request to cause cached page translations in the I/O device to be invalidated.

In Example 18, the method of Example 17 further comprising: transmitting the page translation responses comprises the modified permissions to the I/O device.

In example 19, the method of Example 17, further comprising: forgo transmitting a response to a page fault request from the I/O device.

In Example 20 the method of Example 17, further comprising: receiving instructions to exit the pause of the communication between the I/O device and the memory.

Various implementations may have different combinations of the structural features described above. For instance, all optional features of the processors and methods described above may also be implemented with respect to a system described herein and specifics in the examples may be used anywhere in one or more implementations.

In example 21 is a non-transitory computer-readable medium storing instructions, which when executed by a processor comprising a core to execute instructions; memory coupled to the core; and memory management circuitry coupled to, the memory, the core and an I/O device that supports page faults, the memory management circuitry comprising: an express invalidations controller; and a page translation permission controller, cause the processor to execute a plurality of logical operations comprising: 1) while the core is executing the instructions: 2) receive instructions to pause communication between the I/O device and the memory; and 3) in response to receiving the instructions to pause the communication: modify permissions of page translations responses by the page translation permission controller; and transmit an invalidation request, by the express invalidations controller to the I/O device, to cause the cached page translations in the I/O device to be invalidated.

In Example 22, the non-transitory computer-readable medium of Example 21, wherein the memory management circuitry is further to transmit the page translations comprising the modified permissions to the I/O device.

In Example 23, the non-transitory computer-readable medium of Example 21, wherein the memory management circuitry is further to forgo transmitting a response to a page fault request from the I/O device.

In Example 24, the non-transitory computer-readable medium of Example 21, wherein the memory management circuitry is further to receive a command to exit the pause of the communication between the I/O device and the memory.

In Example 25, the non-transitory computer-readable medium of Example 24, wherein the memory management circuitry is further to: in response to receiving the command to exit the pause of the communication, transmit requested page translations to the I/O device.

In Example 26, the non-transitory computer-readable medium of Example 24, the memory management circuitry is further to: in response to receiving the command to exit the pause of the communication, transmit a response to a page fault request from the I/O device.

In Example 27, the non-transitory computer-readable medium of Example 24, wherein the memory management circuitry receives the command to exit the pause of the communication from systems software.

In Example 28, the non-transitory computer-readable medium of Example 21, wherein the memory management circuitry receives the command to pause the communication from the memory.

Various implementations may have different combinations of the structural features described above. For instance, all optional features of the processors and methods described above may also be implemented with respect to a system described herein and specifics in the examples may be used anywhere in one or more implementations.

Example 29 is an apparatus comprising: 1) means for while a core is executing instructions: a) means for receiving instructions to pause communication between an I/O device that supports page faults and memory; and b) means for in response to receiving the instructions to pause the communication modifying permissions of page translation responses; and transmitting, to the I/O device, an invalidation request to cause the cached page translations in the I/O device to be invalidated.

In Example 30, the apparatus of Example 29 further comprising means for, transmitting the page translation responses comprises the modified permissions to the I/O device.

In Example 31, the apparatus of 29, further comprising means for forgo transmitting a response to a page fault request from the I/O device.

In Example 32 the apparatus of 29, further comprising means for receiving a command to exit the pause of the communication between the I/O device and the memory.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of 'to,' 'capable of/to,' and/or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
   a core to execute instructions; and
   memory management circuitry coupled to memory, the core, and an input/output (I/O) device that supports page faults, the memory management circuitry comprising:
      page translation permission circuitry to modify permissions of page translation responses to generate modified permissions in response to receiving, from the memory to the memory management circuitry, a command to pause communication between the I/O device and the memory, wherein the command to pause communication between the I/O device and the memory is transmitted based on memory consumption or bandwidth congestion; and
      express invalidations circuitry to transmit, to the I/O device, an invalidation request to cause cached page translations in the I/O device to be invalidated in response to the command to pause the communication between the I/O device and the memory.

2. The processing device of claim 1, wherein the page translation permission circuitry is further to transmit a translation response comprising the modified permissions to the I/O device in response to a translation request being received by the memory management circuitry from the I/O device.

3. The processing device of claim 2, wherein the memory management circuitry is further to:
   forgo transmitting a response to a page fault request from the I/O device, the page fault request being transmitted by the I/O device in response to the translation response.

4. The processing device of claim 1, wherein the memory management circuitry is further to:
   receive a command to exit the pause of the communication between the I/O device and the memory.

5. The processing device of claim 4, wherein the memory management circuitry is further to:
   in response to receiving the command to exit the pause of the communication, transmit requested page translations to the I/O device.

6. The processing device of claim 4, wherein the memory management circuitry is further to:
   in response to receiving the command to exit the pause of the communication, transmit a response to a page fault request from the I/O device.

7. The processing device of claim 4, wherein the memory management circuitry receives the command to exit the pause of the communication from system software.

8. A processing system comprising:
   memory; and
   a processing device comprising:
      a core to execute instructions; and
      memory management circuitry coupled to the memory, the core, and an input/output (I/O) device that supports page faults, the memory management circuitry comprising:
         page translation permission circuitry to modify permissions of page translations responses to generate modified permissions in response to receiving from the memory to the memory management circuitry, a command to pause communication between the I/O device and the memory, wherein the command to pause communication between the I/O device and the memory is transmitted based on memory consumption or bandwidth congestion; and
         express invalidations circuitry to transmit, to the I/O device, an invalidation request to cause cached page translations in the I/O device to be invalidated in response to the command to pause the communication between the I/O device and the memory.

9. The processing system of claim 8, wherein the page translation permission circuitry is further to transmit a translation response comprising the modified permissions to the I/O device in response to a translation request being received by the memory management circuitry from the I/O device.

10. The processing system of claim 9, wherein the memory management circuitry is further to:
    forgo transmitting a response to a page fault request from the I/O device, the page fault request being transmitted by the I/O device in response to the translation response.

11. The processing system of claim 8, wherein the memory management circuitry is further to:
    receive a command to exit the pause of the communication between the I/O device and the memory.

12. The processing system of claim 11, wherein the memory management circuitry is further to:
in response to receiving the command to exit the pause of the communication, transmit requested page translations to the I/O device.

13. The processing system of claim 11, wherein the memory management circuitry is further to:
in response to receiving the command to exit the pause of the communication, transmit a response to a page fault request from the I/O device.

14. The processing system of claim 11, wherein the memory management circuitry receives the command to exit the pause of the communication from system software.

15. A method comprising;
receiving, by memory management circuitry during execution of instructions by a core, from memory to the memory management circuitry, a command to pause communication between an input/output (I/O) device that supports page faults and the memory, the memory management circuitry being coupled to the memory, the core, and the I/O device, wherein the command to pause communication between the I/O device and the memory is transmitted based on memory consumption or bandwidth congestion;
modifying, by page translation permission circuitry of the memory management circuitry, permissions of page translation responses to generate modified permissions in response to the command to pause the communication; and
transmitting, by express invalidations circuitry of the memory management circuitry to the I/O device, an invalidation request to cause cached page translations in the I/O device to be invalidated in response to the command to pause the communication between the I/O device and the memory.

16. The method of claim 15, further comprising:
transmitting, by the page translation permission circuitry, a translation response comprising the modified permissions to the I/O device in response to a translation request being received by the memory management circuitry from the I/O device.

17. The method of claim 16, further comprising:
forgoing transmitting a response to a page fault request from the I/O device, the page fault request being transmitted by the I/O device in response to the translation response.

18. The method of claim 15, further comprising:
receiving a command to exit the pause of the communication between the I/O device and the memory.

* * * * *